Nov. 3, 1959     B. P. THIBAULT     2,911,236
SEMI-FLEXIBLE PIPES AND PIPE CONNECTING MEANS
Filed Nov. 12, 1957
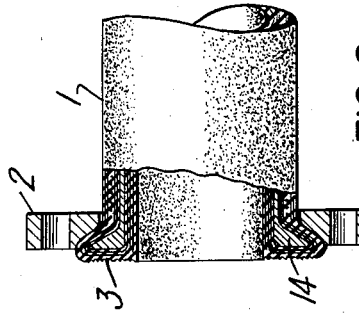
FIG. 2.
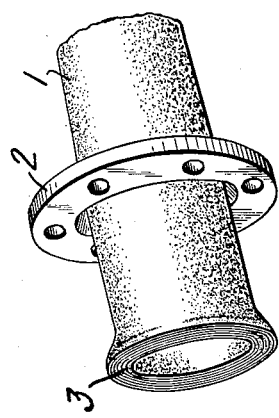
FIG. I.
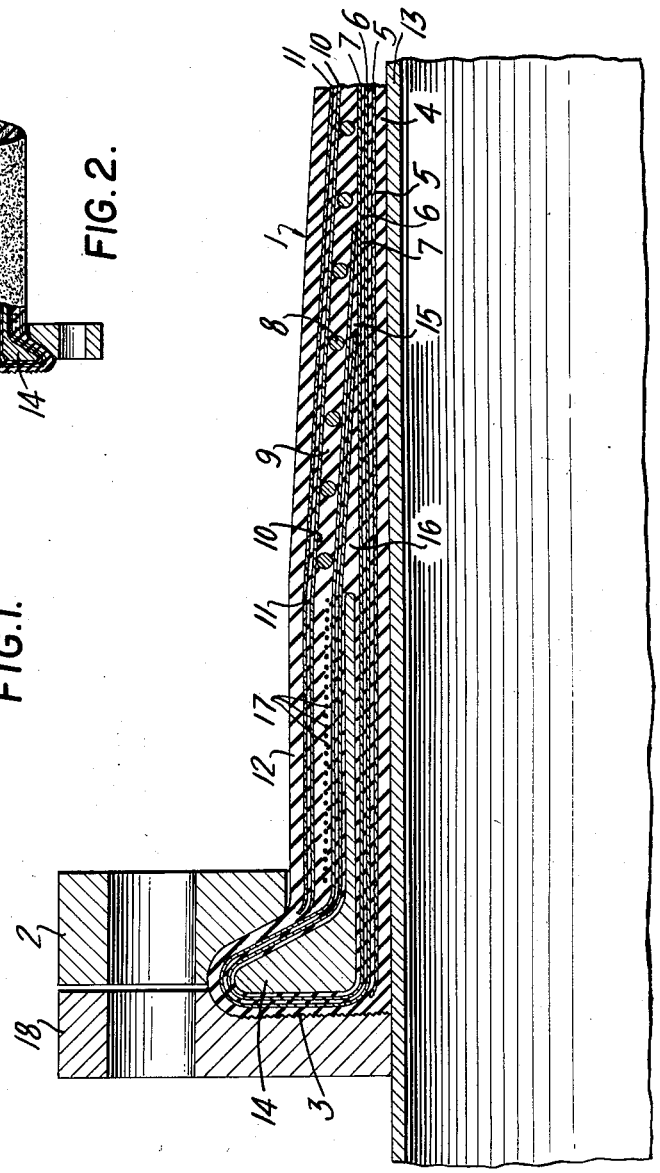
FIG. 3.

United States Patent Office 2,911,236
Patented Nov. 3, 1959

2,911,236

SEMI-FLEXIBLE PIPES AND PIPE CONNECTING MEANS

Bernard Pierre Thibault, Decize, Nievre, France, assignor to Societe Anonyme dite: Pneumatiques & Caoutchouc Manufacture Kleber Colombes, Colombes, France Application November 12, 1957, Serial No. 695,837

Claims priority, application France November 9, 1956

6 Claims. (Cl. 285—149)

This invention relates to semi-flexible pipes and to methods and means of connecting such pipes with one another, and with various units of equipment such as valves, tanks, pumps, or the like.

The invention is more particularly concerned with flexible and semi-flexible pipes made of reinforced rubber-like material, wherein the reinforcements are in the form of wire mesh or similar elements, and still more particularly the invention is directed towards such pipes and conduits of comparatively large diameters.

It is an object of the invention to provide flexible piping of comparatively large diameter and low wall thickness, which will withstand a wide range of positive and negative pressures.

Another object is to provide an improved connecting system particularly suited for use in conjunction with large-diameter, thin-walled semi-flexible piping working under high service pressures. It is a related object to provide a method of producing such pipes and pipe connecting means.

In one aspect the invention essentially resides in a novel arrangement of the terminal section of semi-flexible piping, involving a generally annular flanged stiffener member imbedded in the rubber material of the terminal section of the pipe, with the reinforcing wires being folded back over and around said terminal member and circumferential binding means being further preferably coiled around said terminal member and around said folded-over reinforcing wires to provide against radial stresses, in said terminal section.

The above and further objects, aspects, features and advantages of the invention will appear more fully as the disclosure proceeds, with reference to the accompanying diagrammatic drawings which illustrate an exemplary embodiment of my invention:

Fig. 1 is a perspective view of an end section of piping according to the invention, provided with a connecting flange and collar;

Fig. 2 is an axial section of the assembly shown in Fig. 1, with the internal means omitted.

Fig. 3 is a partial axial sectional view shown on an enlarged scale during a stage of manufacture of the improved pipe.

As shown in Fig. 1 an improved pipe section according to this invention, generally designated 1, is formed with an integral terminal flange 3 and carries a connecting collar 2 whereby the pipe section under consideration may be coupled with another similar pipe section or with a unit of apparatus. It will be noted that the collar 2 is of a single piece rather than being in two parts as was heretofore customary in pipes of the class considered, and that said collar 2 is incapable of being removed from the pipe section 1 since its inner diameter is smaller than the diameter of the end flange 3 while being larger than the outer diameter of pipe 1 so as to be freely slidable thereon. Fig. 2 illustrates how the collar 2 and end flange 3 have partially mating surfaces adapted to engage each other when the collar 2 is positioned for connection with a similar collar on another length of piping or unit of apparatus.

Reference will now be had to Fig. 3 which illustrates in detail the features of the present invention. It will be noted first that the pipe section shown has a comparatively thin wall thickness relatively to its diameter and also in relation to the pressures it is capable of withstanding. These advantageous features are attained through the use of the construction about to be described.

The pipe 1 comprises an inner body or lining 4 made of a suitable natural or synthetic rubber composition or equivalent elastomer selected with due regard to the type of fluid that the finished pipe is to deliver, i.e. the inner lining 4 may be predetermined to provide optimum chemical resistance or abrasion strength in the case of particle-laden fluids, and so forth. The inner rubber lining 4 is held in place by a web of twilled breaker or textile fabric 5. Arranged around the web of fabric 5 are two superimposed webs of wire cable mesh or webbing 6 and 7 which are wound in opposite directions to each other so that the wires therein form substantially equal and opposite angles with the axis of the pipe. The webs 5 and 6 are of a conventional construction each comprising a plurality of parallel spaced wires or wire cables forming a flat weftless web prior to being wound around the piping, with the individual wires or wire cables being retained in assembly with rubber.

The wire webs 6 and 7 are constructed and arranged so as to be capable of withstanding relatively high internal pressures. Wound in turn about the webs 6 and 7 is a heavy diameter steel wire 8 with its adjacent turns in spaced relation, and the essential function of which is to prevent collapse of the pipe in case of negative internal pressures and/or external loads or the like. More than one winding of wire or cable such as 8 may be provided if desired. The space between the turns of the wire 8 is filled with rubber filling composition 9.

A further web 10 of wire cable which may be similar to webs 6 and 7 is around the wire 8, its chief purpose being to serve as a stiffener for the pipe walls. The web 10 provides in effect a lacing for the rubber composition 9 and prevents collapse and damage thereto when the pipe bends. While more than one web such as 10 may be provided if desired a single web at this location has been found fully satisfactory.

Surrounding the wire web 10 is a web 11 of twill fabric or breaker generally similar to the web 5, and around this is an outer lining 12 of rubber r rubber-like composition predetermined with due regard to external service conditions, e.g. whether the outer pipe surface will be liable to frictional wear and abrasion from moving parts in which case the composition 12 would be selected highly wear-resistant, or whether said outer surface will be liable to contamination with oil as where the pipe may have to be dragged along a workshop or worksite in which case the composition 12 would be selected for its resistance to chemical attack.

At the end of the pipe section described there is provided a connecting system according to the invention, which system is formed during the manufacture of the pipe and provides a structural and functional whole therewith. It is noted in this connection that the novel pipe connecting means now to be described are especially well-suited for use with the novel pipe construction described hereinabove. While such a pipe construction may be used in conjunction with other suitable types of connecting devices the connecting system of the invention is preferably used on piping of generally similar construction to that described.

The novel pipe connecting system of the invention may best be understood from a detailed description of the method of manufacturing the end section of the pipe generally described above, and reference being again had to Fig. 3 for the purpose of this further description.

As there shown the pipe section described is formed around a tubular mandrel 13, e.g. a metal tube, corresponding in outer diameter to the inner diameter of the pipe. Placed around the mandrel 13, successively, are the inner rubber lining 4, then the fabric web 5, then the wire cable webs 6 and 7, all as described above. At this stage the collar 2 is passed around the mandrel and in accordance with a feature of the invention this collar 2 will subsequently serve as a vulcanizing mold during the curing of the pipe, before ultimately being used as a connecting collar or flange in service.

At this point the annular member 14 which constitutes the reinforcing armature for the connector portion, is passed around the outer wire web 7. The member 14 is made of a rigid material, preferably metal, e.g. a light alloy, and may be a casting or a machined member. As shown, the member 14 includes a relatively thin-walled tubular section of relatively long axial extent and a thick outwardly projecting flange portion at its outer end, the flange being generally triangular in cross section with rounded corners. The member 14 may be formed by welding a suitable ring-like part to a tubular element and then machining (e.g. turning) the resulting assembly to the requisite shape as shown. The tubular section of member 14 is sufficiently larger in inner diameter than the inner diameter of the piping so that the inner rubber wall of rubber and the two wire cable webs of reinforcement may be conveniently disposed within the pipe without crowding the cross section of the rubber lining 4.

The wire webs 6 and 7 are then folded back over the outer periphery of the flanged portion of annular member 14 so as to reach to a point 15 well beyond the inner end of the member 14 and the space 16 between the main and the folded-over portions of the wire webbing elements 6 and 7 is filled with rubber composition. A circumferential binding element in the form of a steel wire 17 having closely spaced turns is then wound around the elements 6 and 7 over the tubular portion of member 14. The large-diameter wire 8 is then wound as previously described the turns of this wire being carried over the end part of the folded-over web portions 6 and 7 but being stopped short of the inner end of annular armature member 14.

The wire webbing element 10 is then positioned so as to reach substantially as far as the near surface of the terminal flange portion of member 14, and the fabric webbing element 11 is placed around the element 10, all as previously described. The assembly is then coated with one or more layers of rubber composition so that the various elements of the terminal assembly or connecting means described above are completely imbedded therein, as shown in Fig. 3.

The collar 2 inserted at an earlier stage of the process as indicated above, is then moved towards the end of the pipe section, it being noted that the contour and inner diameter of the collar 2 are predetermined to correspond with the contour and diameter of the flanged part of member 14. The inner contour of collar 2 is adapted to serve as a vulcanizing mold in the curing process applied to the pipe assembly. For this purpose a backing plate 18 of suitable configuration to mate both with the outer end face of collar 2 and with the outer end face of the flanged end 3 of the pipe 1, is positioned in engagement with the end surfaces of the pipe 1 and collar 2.

It will be appreciated that the connecting collar 2 and backing plate 18 cooperate to provide a simple and highly efficient vulcanizing mold, eliminating the requirement for a separate mold of special removable construction or of fabric webbing as sometimes used, which is difficult to position and retain in correct relationship during the curing operation. The main body of the pipe 1 may of course be vulcanized in accordance with conventional procedure.

The collar 2 remains positioned on the pipe on completion of the curing process and cannot be removed therefrom, so that it will not be liable to loss during storage and transportation or on the worksite. It will be appreciated that the arrangement of the invention is considerably more advantageous than the conventional arrangements where the connecting collars corresponding to collar 2 were usually made in two parts so as to be insertable around the pipe after completion of the latter. In addition to the fact that such a two-part collar could not serve as a curing mold as does the collar 2 of the invention, the two-part collar is obviously weaker, more complicated and expensive to make and mount and liable to loss.

The pipe section is preferably delivered to site with the backing plate 18 in position, being secured to the collar 2 with bolts extending through registering boltholes formed in the plate and collar. Where the pipe is to be used in a permanent installation, the backing plate 18 is removed. The requisite fluid tightness of the pipe connection is present due to the elasticity of the rubber composition on the end face of flange 3. It will be noted that fluid flowing through the pipe does not come into contact with any substance other than that of the rubber lining 4.

In cases where the pipe is to be frequently disassembled and reassembled, a backing plate 18, which may be the same plate as the one that was initially used as a mold in the curing operation, or another plate which may have a different thickness and/or composition depending on the projected use, is preferably retained in position against the flange 3 in bolted assembly with collector collar 2 in order to protect the rubber end surface of the pipe flange. A seal may then preferably be used for obtaining the desired fluid-tight connection. In all cases the connecting collar 2 is preferably formed with two or more boltholes around its periphery as illustrated.

As already described the annular armature member 14 is provided in the form of a tube having a thickened end flange preferably of rounded triangular contour in cross section. This shape imparted to the annular armature member of the invention has a number of important advantages. Thus it provides a convenient shape for receiving and guiding the wire reinforcement webs in folded-over relationship around the end flange of the member 14, with said webs being retained in position by the circumferential binding wire 17 around the straight tubular section of member 14. Furthermore, the reinforced end section of the flanged armature 14 will serve to transmit and take up the comparatively large compression forces developed between the adjacent terminal faces of the connected pipe sections after the connecting collars such as 2 have been bolted together, thereby permitting firmer connections ensuring a high degree of fluid tightness without risking any damage to the connected pipe ends.

It will be understood that various modifications may be made in the construction shown without departing from the scope of the invention.

What I claim is:

1. A pipe comprising a tubular body of rubber-like composition having a flanged end, a stiffener member imbedded in said body and comprising a relatively thin-walled straight tubular section extending a substantial axial distance into said pipe and a thickened flange section integral with said straight section and imbedded in said flanged end of the pipe, said thickened flange section having a thickness in the axial direction of said pipe substantially less than the axial dimension of said thin-walled straight tubular section but substantially greater than the radial dimension of said thin-walled straight tubular section, wire reinforcing webbing imbedded in said pipe body radially inwardly of said stiffener member so as to extend along the inner periphery of said tubular section thereof and folded outwards around said flanged section and back over the outer periphery of said tubular section, and circumferential reinforcement means surrounding said folded-back portion of said webbing to bind it around said tubular section of the stiffener member.

2. A pipe as claimed in claim 1, wherein said wire webbing comprises two superimposed webbing elements comprising spaced wires extending at substantially equal and opposed angles to the axis of the pipe.

3. A pipe as claimed in claim 1, wherein said circumferential reinforcement means comprises a wire helically wound with adjacent turns in substantially contacting relationship.

4. A pipe comprising a tubular body of rubber-like composition having flanged ends, stiffener members imbedded in said body at opposite ends thereof and each comprising a relatively thin-walled straight tubular section extending a substantial axial distance into said pipe and a thickened flange section integral with said straight section and imbedded in the related end flange of said pipe, said thickened flange section having a thickness in the axial direction of said pipe substantially less than the axial dimension of said thin-walled straight tubular section but substantially greater than the radial dimension of said thin-walled straight tubular section, and wire reinforcing means imbedded in said body in tightly surrounding relation with both stiffener members.

5. A pipe as claimed in claim 4, wherein said stiffener members are metallic.

6. A pipe comprising a tubular body of rubber-like composition having a flanged end, a stiffener member imbedded in said body and comprising a relatively thin-walled straight tubular section extending a substantial axial distance into said pipe and a thickened flange section integral with said straight section and imbedded in said flanged end of the pipe, wire reinforcing webbing imbedded in said pipe body radially inwardly of said stiffener member so as to extend along the inner periphery of said tubular section thereof and folded outwards around said flanged section and back over the outer periphery of said tubular section, and circumferential reinforcement means surrounding said folded-back portion of said webbing to bind it around said tubular section of the stiffener member, said folded-back portion of said webbing extending inwardly of the pipe a substantial axial distance beyond the inner end of said stiffener member and a circumferential helically-wound reinforcing wire wound around said webbing substantially throughout the length of said pipe and over said folded-back portion of the webbing but stopping short of said inner end of the stiffener member.

References Cited in the file of this patent

UNITED STATES PATENTS

| 762,954 | Smith | June 21, 1904 |
| 1,939,872 | Bedur | Dec. 19, 1933 |
| 2,241,355 | MacLachlan | May 6, 1941 |
| 2,298,736 | Harpfer | Oct. 13, 1942 |
| 2,730,133 | Holland-Bowyer et al. | Jan. 10, 1956 |